June 28, 1960  J. R. OISHEI ET AL  2,942,585
WINDSHIELD WIPER MOTOR ARRANGEMENT
Filed Dec. 24, 1956  2 Sheets-Sheet 1

INVENTOR.
JOHN R. OISHEI AND
BY ANTHONY F. SPICCIATI

Bean Brooks Buckley & Bean
ATTORNEYS

June 28, 1960  J. R. OISHEI ET AL  2,942,585
WINDSHIELD WIPER MOTOR ARRANGEMENT
Filed Dec. 24, 1956  2 Sheets-Sheet 2

INVENTOR.
JOHN R. OISHEI AND
BY ANTHONY F. SPICCIATI

Bean Brooks Buckley + Bean.
ATTORNEYS

United States Patent Office 2,942,585
Patented June 28, 1960

2,942,585

WINDSHIELD WIPER MOTOR ARRANGEMENT

John R. Oishei and Anthony F. Spicciati, Buffalo, N.Y., assignors to Trico Products Corporation, Buffalo, N.Y.

Filed Dec. 24, 1956, Ser. No. 630,170

6 Claims. (Cl. 121—114)

This invention relates to windshield wiper motors and more particularly to an arrangement having a plurality of wiper motors operated in synchronism by means of a separate control valve.

The styling of motor vehicles of contemporary design, has created problems in the installation of windshield wiping arrangements. Such problems result from certain conditions, such as the increase in size of windshields as typified by the panoramic or wraparound type, resulting in greater windshield wiper areas, and diminished space beneath the instrument panel due to a plethora of control units and accessories. Accordingly, windshield wiper arrangements having wiper motors with greater torque output, and of less space consuming dimensions, are required.

The windshield wiper arrangement of the present invention is particularly well suited for use in motor vehicles having the conditions mentioned. Briefly, the windshield wiper arrangement of the present invention comprises a pair of pressurized hydraulic fluid powered wiper motors and a separate control mechanism for the synchronous operation of the wiper motors. The control mechanism is connected to the wiper motors by a plurality of conduits, thus eliminating the use of a motion transmission arrangement, such as connecting rods or flexible cables as used in conventional windshield wiper arrangements.

Each wiper motor in the arrangement of the invention, is adapted to move the wiper blade within a fixed pattern upon the windshield, which wiper motor may be of relatively small size thus requiring less space for installation. The use of high-pressure wiper motors poses no problem since in current motor vehicle design provision is made for high-pressure fluid generating means for use in certain power operated assemblies, such as, power steering, power operated windows, power seating adjustment mechanisms, etc.

The main object of this invention is to provide a motor vehicle with a windshield wiper arrangement having increased wiper arm torque characteristics, and decreased space requirements.

A further object is to provide a windshield wiper arrangement having a plurality of high-pressure fluid wiper motors with a separate control mechanism for the operative control of the wiper motors.

Still another object of the invention is to provide a windshield wiper arrangement with a plurality of wiper motors in which need for a motion transmission mechanism, such as connecting rods or flexible cables, is eliminated.

These and further objects and features of the invention will become more apparent from the following description and the accompanying drawings wherein.

Figures 1, 2, 3:
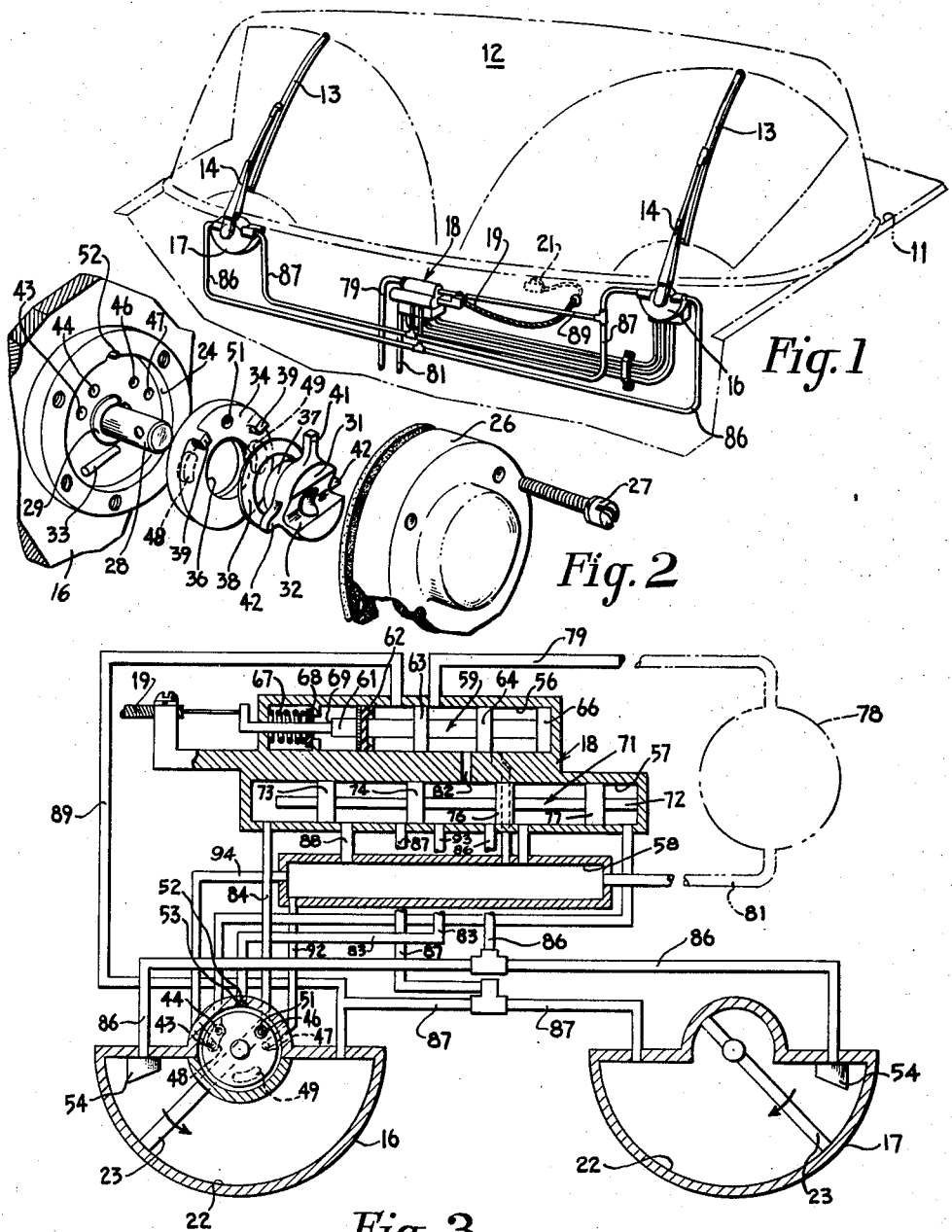
Fig. 1 is a fragmentary perspective view of a motor vehicle having a windshield wiper arrangement embodying the principles of the invention.
Fig. 2 is an exploded perspective view illustrating certain mechanical components used in one of the wiper motors of Fig. 1.
Fig. 3 is a schematic diagram illustrating the windshield wiper arrangement of Fig. 1 with certain movable parts in one position during operation.

Referring now to the drawings and more particularly to Fig. 1, numeral 11 identifies a motor vehicle having a windshield 12 of the panoramic type, on which is positioned a pair of wiper blades 13 supported by wiper arms 14 for wiping action thereupon. A wiper motor 16 is positioned for the operative support of a wiper arm 14 while a wiper motor 17 is positioned for the operative support of the other wiper arm 14. The wiper motors 16 and 17 are somewhat similar in exterior appearance, however, the wiper motor 16 includes a valve mechanism forming part of the system contributing to the synchronous operation of both of the wiper motors. A unitary control mechanism 18 positioned mid-way between the wiper motors, is adapted to regulate the operation of the wiper motors, which control mechanism may be set by the vehicle operator to achieve the desired rate of wiper operation. For such purpose, a control cable 19 in the form of a Bowden wire, has one end connected to the control mechanism 18, the other end of the cable having a cable moving knob 21, which knob is located for convenient manipulation by the vehicle operator.

The wiper motors each include a housing forming a semi-circular motor chamber 22 in which is arranged a vane-like piston 23 pivoted near one end to permit swinging movement of the piston within the chamber. The motor 16 includes a valve chamber 24 (Fig. 2) arranged on the side thereof and formed in part by a removable valve cap 26 secured to the side of the motor by suitable fastening means such as screws 27. The piston 23 of the motor 16 is mounted upon the drive shaft 28 one end of which projects from the motor for the support of the wiper arm 14, the opposite end of which extends into the valve chamber 24, said piston being fixed against axial movement in one direction by means of a split washer 29 which engages a groove formed in the shaft and abuts the adjacent side of the valve chamber 24. A kicker element 31 is supported upon the end of the shaft 28 and has a diametrically arranged V-notch 32 formed in the outer end for reception of the ends of pin member 33 which is mounted toward the end of the shaft 28. The purpose of the pin engaged notch is to avoid a rigid connection between the kicker element 31 and the motor shaft 28 to avoid breakage which could result from over-travel of the piston during motor operation. Surrounding the shaft is a disc valve 34 arranged between the kicker element 31 and the side wall of the valve chamber 24, said disc valve having a central hole 36 to permit rotary support of the disc valve upon a hub 37 formed on the kicker element 31. A spring washer 38 is interposed between the kicker element 31 and the disc valve to maintain the disc valve seated against the end surface of the valve chamber 24. A pair of fingers 39 project from the side surface of the disc valve, said fingers being positioned for alternate engagement by a finger 41 formed on the kicker element as the latter is oscillated by motor shaft 28.

The kicker element 31 has a pair of radially projecting fingers 42 which are adapted to alternately engage an abutment (not shown) formed in the valve cap 26 to thus provide limited rotary movement of the kicker element 31. It will be seen that rotary movement of the shaft 28, after one of the fingers 42 has engaged the cap abutment, will result in the ends of the pin member 33 riding up the sides of the V-notch 32 causing axial movement of the kicker element 31 inwardly upon the motor shaft and against the compression of spring washer 38. In such manner, breakage of the kicker element is avoided.

On the side wall of the valve chamber are symmetrically arranged about the vertical centerline two pairs of portholes 43, 44, and 46, 47, which form the ends of passageways, as will be described in greater detail. The disc valve 34 has formed on its side surface a pair of kidney shaped grooves 48 and 49, the groove 48 being adapted to bridge the portholes 43 and 44, while the groove 49 is adapted to bridge the portholes 46 and 47. The disc valve 34 includes a hole 51 arranged for connecting the volume of the valve chamber 24 with either porthole 44 or 46, depending upon the angular position of the disc valve. A semicircular groove 52 is formed in the top inner surface of the valve chamber 24, which groove coincides with a porthole 53 opening into the valve chamber, said porthole forming the end of a passageway arranged for the delivery of high-pressure fluid to the valve chamber.

Each wiper motor 16 and 17 has a piston parking seat 54 located within the piston chamber 22, said seat being arranged for engagement by the motor piston during motor parking. It is to be noted that the wiper motor 17 does not include a valve chamber, as described in detail above with reference to the wiper motor 16. In effect, the wiper motor 16 will be seen to be somewhat in the nature of a lead motor which functions to regulate the synchronous operation of the two wiper motors.

Figure 4:
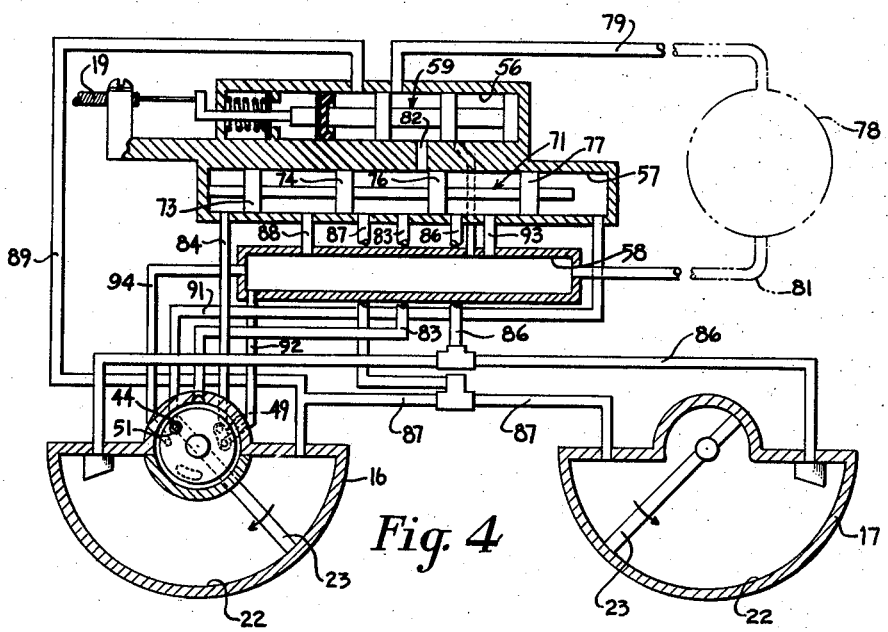
Fig. 4 is the same as Fig. 3 showing the position of the movable parts in another phase of operation.
Figure 5:
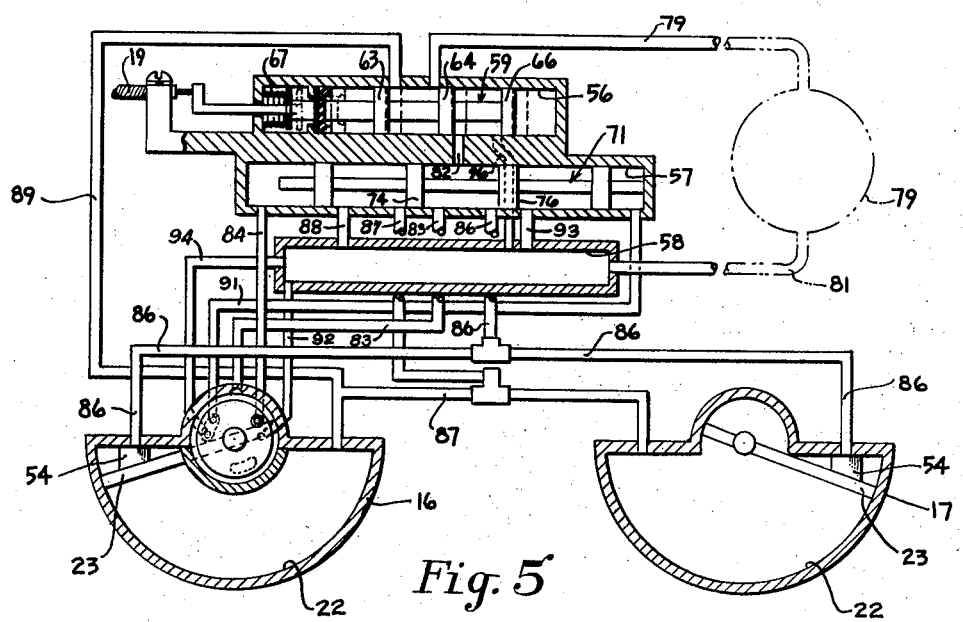
Fig. 5 is the same as Fig. 3 but showing the position of the movable parts when the wiper motors are parked.

The control mechanism 18, comprises a control valve chamber 56, a distributing valve chamber 57, and an exhaust manifold 58 (see Figs. 3–5). Positioned within the control valve chamber 56 is a slide valve 59 consisting of a piston rod 61, and piston heads 62, 63, 64, and 66 arranged in spaced relationship upon the piston rod. The end of the piston rod extends outwardly of the control valve chamber and has attached thereto control cable 19, so that movement of the control cable will cause movement of the slide valve 59. A compression spring 67 surrounds the piston rod at one end and is positioned between a movable washer 68 and the inner end of the control valve chamber. It will be seen that when the slide valve 59 is moved a given amount toward the left end of the control valve chamber, a shoulder 69 formed on the piston rod will abut the washer 68 and compress the spring 67. Such action will take effect during motor parking, as will be further described hereinafter.

Slidably arranged within the distributing valve chamber 57 is a slide valve, or distributing valve 71, comprising a piston rod 72 and piston heads 73, 74, 76, and 77 mounted thereon in spaced relation. The piston rod 72, being of less length than the length of the distributing valve chamber 57, will allow a certain amount of reciprocating movement of the slide valve 71 within said valve chamber.

The control mechanism 18 is arranged in a hydraulic circuit having a liquid pressurizing means, such as a pump 78, to which is attached a high-pressure line in the form of a hose or conduit 79, opening into the control valve chamber 56, and a low-pressure line in the form of a hose or conduit 81 which opens into the exhaust manifold 58. As best seen in Fig. 3, which illustrates the position of the slide valve 59 during motor operation, high-pressure fluid flowing from hose 79 will enter the control valve chamber 56 between pistons 63 and 64, will flow onwardly to the distributing valve chamber 57, via passageway 82, entering the valve chamber in the region defined between the piston heads 74 and 76, and thence will flow onwardly via hose or conduit 83 to the valve chamber 24 of the wiper motor 16, entering said chamber by way of porthole 53. Fluid flow will continue through the hole 51, formed in the disc valve 34, then into porthole 46 and hose or conduit 84 which connects porthole 46 with one end of the distributing valve chamber 57, to exert pressure upon the piston head 73, to maintain the distributing valve 71 toward the right end of the distributing valve chamber 57. In such position of the distributing valve 71, it will be seen that pressure fluid within the volume defined between piston heads 74 and 76, will also flow into hose or conduit 86, which is bifurcated for connection with the interior of the parking seats 54 of the wiper motors. Pressure fluid entering the wiper motor piston chamber 22, will thus act upon one side of the wiper motor piston 23 to cause rotary movement thereof, such motion being counterclockwise in the wiper motor 16, and clockwise in the wiper motor 17, as seen in Fig. 3. Wiper motor piston movement will result in the rotation of the motor drive shafts 28, to thus provide wiper action of the wiper arms 14 and associated wiper blades 13, for the wiping of the windshield.

During such rotary movement of the motor piston 23, the liquid on the side of the piston opposite to that being exposed to high-pressure liquid, will be forced out of the piston chamber 22 and enter hose 87, from whence it will flow into the distributing valve chamber 57 in the volume defined between piston heads 73 and 74, and will leave said volume via hose or conduit 88, which opens into the exhaust manifold 58, for flow back to the pump 78 via hose 81. The hose 87 has connected thereto another hose 89 which opens into the control valve chamber 56 in the volume defined between piston heads 62 and 63, the reason for which will be described later in conjunction with motor parking operation.

As the piston in the wiper motor 16 approaches the end of rotary movement, finger 41 of the kicker element 31 will engage one of the fingers 39 of the disc valve 34 to cause rotary motion of the disc valve. As a result, the alignment between disc valve hole 51 and porthole 46 will be disrupted, and the disc valve hole 51 will be brought into alignment with the porthole 44.

Referring now to Fig. 4, it will be seen that when distributing valve hole 51 is brought into alignment with the porthole 44, the pressure fluid within the valve chamber 24 will now enter a hose or conduit 91, which opens into the distributing valve chamber 57 at the extreme right end thereof, to exert pressure upon the side of the piston head 77 of the distributing valve 71. Simultaneously, the kidney shaped groove 49 of the disc valve, will bridge the portholes 46 and 47 thus permitting the fluid in the distributing valve chamber 57 in the volume defined by the piston head 73 and the extreme left end of said chamber, to flow into hose 84 through porthole 46, groove 49, and porthole 47 into a hose 92 which opens into the exhaust manifold 58, from whence the liquid may flow back to the pump 78 via hose 81. As a result of the difference in pressure acting upon the distributing valve 71, it will be shifted toward the left end of the distributing valve chamber 57. In such position, it will be seen that pressure fluid within the distributing valve chamber 57 between piston heads 74 and 76, will now flow into hose 87 to enter the wiper motor piston chambers 22 and act upon the pistons 23 to cause rotary movement thereof, such movement being clockwise in the wiper motor 16, and counter-clockwise in the wiper motor 17, resulting in wiper movement upon the windshield in the reverse direction to that above described.

During such movement of the wiper motor pistons, the liquid on the opposite side of the piston to that being exposed to high-pressure fluid, will flow into the hose 86 and then into the distributing valve chamber 57 in the region defined between piston heads 76 and 77, from whence it will flow into a hose or conduit 93 back into the exhaust manifold 58 for return to the pump 78 via hose 81.

Such wiper motor action will continue until the wiper motor pistons 23 approach end of stroke at which time the finger 41 of the kicker element 31 will engage a finger 39 of the disc valve 34 to cause rotation of the latter. Such rotation will disrupt the alignment between disc valve hole 51 and porthole 44, and re-establish alignment between disc valve hole 51 and porthole 46. As a result thereof, high-pressure liquid will flow from the valve chamber 24 into hose 84 to enter the distributing valve chamber 57 and exert pressure upon the piston head 73. Simultaneously, the portholes 43 and 44 will be bridged by kidney groove 48 to allow liquid flow from the end of the distributing valve chamber, via hose 91 into a hose or conduit 94 which connects porthole 43 with the exhaust manifold 58. The pressure differential thus created upon the slide valve 71 will cause it to be shifted toward the right end of the distributing valve chamber 57 creating fluid circuits as has been previously described in connection with Fig. 3, to cause counter-clockwise movement of the piston in wiper motor 16, and clockwise movement of the piston in wiper motor 17.

The relative position of certain movable parts for and during parking is illustrated in Fig. 5. To effect motor parking the vehicle operator turns the knob 21 so that the slide valve 59 is moved toward the left end of the control valve chamber 56, compressing the spring 67 in so doing. In such position of the slide valve, it will be seen that flow of pressure fluid will be cut off from passageway 82, and instead, flow of pressure fluid will occur in the hose 89. Fluid flow in hose 89, will continue in hose 87 to the wiper motor chambers 22, where pressure will be exerted upon the wiper motor pistons 23 to urge the piston in wiper motor 16 clockwise and the piston in wiper motor 17 counterclockwise. Simultaneously, liquid on the opposite side of the motor piston will flow into hose 86, through the distributing valve chamber 57 in the region between piston 74 and 76, through passageway 82 into the control valve chamber 56, in the region between piston 64 and 66, from whence it will flow into passageway 96 and into the exhaust manifold 58, thence back to the pump 79 via hose 81. Under such conditions, the motor pistons will be quickly seated against a parking seat 54, for parking condition. Upon release of the knob 21 by the vehicle operator, the spring 67 will expand and move the slide valve 59 a slight distance toward the right end of the chamber 56, as illustrated by the dotted line representations of the slide valve pistons, which represent the neutral, or off-position. It will be seen that when the slide valve 59 is in the off-position, the ends of passageway 82, as well as hose 89, are covered by the pistons 64 and 63 respectively, thereby entrapping high-pressure liquid within the control valve chamber 56 in the region between pistons 63 and 64, so that pressure fluid flow for motor operation is inhibited.

It will be further noted from a study of Fig. 5, that during motor parking operation, the distributing valve 71 remains at the right end of the distributing valve chamber 57, so that upon reactivation of the slide valve 59 for motor operation, high-pressure fluid will be caused to flow into the hose 86 resulting in counter-clockwise movement of the piston in the wiper motor 16, and clockwise movement of the piston in the motor 17, causing motor operation as was previously described with respect to Fig. 3.

From the foregoing it will be seen that the principles of the invention may be applied to provide a motor vehicle with a plurality of high-pressure fluid wiper motors having a separate control mechanism for the operative control of the wiper motors. Such an arrangement results in increased wiper arm torque characteristics and decreased space requirements, and in addition, eliminates the need for a motor transmission mechanism, such as connecting rods or flexible cables. It will be further apparent that while the arrangement has been described for utilization of a pressurized hydraulic medium, other types of medium such as compressed air may be used without alteration of the principles of the invention.

The foregoing description has been given in detail without thought of limitation since the inventive principles involved are capable of assuming other physical embodiments without departing from the spirit of the invention and the scope of the appended claims.

What is claimed is:

1. A windshield wiper motor arrangement comprising in combination, a plurality of pressure fluid operated wiper motors, a control mechanism operatively adjustable for the control of pressure fluid to said wiper motors, means remotely mountable for the operative adjustment of said control mechanism, and hose means connecting said control mechanism with the wiper motors, one of said motors having a valve assembly adapted for the synchronous regulation of all of said wiper motors.

2. A windshield wiper motor arrangement for use in motor vehicles comprising in combination a plurality of pressure fluid operated wiper motors, a control mechanism having portions operatively adjustable for the supply control and distribution of pressure fluid to the wiper motors, a remotely positionable control knob connected to said control mechanism for the operative adjustment thereof, and hose means arranged for completion of pressure fluid circuits between the wiper motors and the control mechanism, one of said motors having a valve assembly automatically operable in response thereto and arranged in controlling relation to the distribution portion of said control mechanism for the synchronous regulation of all of said motors.

3. A windshield wiper motor arrangement for use in a motor vehicle comprising in combination a pair of pressure fluid operated wiper motors, a pressure fluid circuit extending between the motors and a source of pressure fluid, and a unitary control mechanism interposed in said circuit, said control mechanism including a first valve and a second valve, said first valve being arranged for manual movement for controlling the flow of pressure fluid through the control mechanism, and said second valve being adapted for movement by fluid pressure differential to direct pressure fluid flow to cause synchronous operation of said wiper motors, and a third valve actuated automatically by one of said motors for reversing the fluid pressure differential acting on said second valve.

4. A windshield wiper motor arrangement comprising in combination, a pair of pressure fluid operated wiper motors each having a drive shaft, a fluid pressure circuit extending between the motors and a fluid pressurizing source, and a control mechanism interposed in said circuit, said control mechanism having a slide valve manually movable for the regulation of pressure fluid flow through the control mechanism, and a distributing valve movable in response to fluid pressure differential whereby pressure fluid is directed to the wiper motors to cause oscillating motion of a drive shaft of each motor, one of said motors including a valve arrangement operable to direct pressure fluid to the control mechanism whereby fluid pressure differential is established upon the distributing valve.

5. A control mechanism for use in a windshield wiper motor arrangement, comprising in combination, plural wiper motors, a slide valve manually movable to running and parking positions for the regulation of pressure fluid flow through the control mechanism, a distributing valve movable in response to fluid pressure differential for establishment of various fluid circuits through the control mechanism for synchronous operation of said plural wiper motors, a wiper motor responsive valve for automatically reversing the fluid-pressure differential acting on said distributing valve, an exhaust manifold adapted for collection of pressure fluid passing through the control mechanism back to a fluid pressurizing source, and resilient means arranged to urge the slide valve from said parking position toward a neutral position in which fluid flow through the control mechanism is prevented.

6. A control mechanism for use in a windshield wiper motor arrangement including a plurality of wiper motors comprising, in combination therewith, a control valve slidably arranged in a control valve chamber, said control valve consisting of pistons mounted upon a valve rod which extends exteriorly of the control mechanism, and a distributing valve slidably mounted in a distributing valve chamber, said distributing valve consisting of pistons mounted upon a valve rod, said control valve being adapted in a first position to admit pressure fluid to the distributing valve chamber and in a second position to inhibit flow of pressure fluid to the distributing valve chamber, said distributing valve being adapted in one position to allow flow of pressure fluid to said plurality of wiper motors to cause synchronized motion thereof in one direction and in another position to cause synchronized motion of said wiper motors in the opposite direction, said control valve being further arranged for selective movement to a third position whereby pressure fluid can flow to said wiper motors for the parking thereof, and means operable automatically upon release of said control valve to return the same to said second position.

References Cited in the file of this patent

UNITED STATES PATENTS

| | | |
|---|---|---|
| 1,363,333 | Lower | Dec. 28, 1920 |
| 1,700,688 | Damerell | Jan. 29, 1929 |
| 1,817,180 | Drake | Aug. 4, 1931 |
| 1,931,452 | Wheeler | Oct. 17, 1933 |
| 2,042,898 | Horton | June 2, 1936 |
| 2,045,140 | Horton et al. | June 23, 1936 |
| 2,053,716 | Huck | Sept. 8, 1936 |
| 2,243,520 | Beharrell et al. | May 27, 1941 |
| 2,258,010 | Horton et al. | Oct. 7, 1941 |
| 2,786,455 | McDonnell et al. | Mar. 26, 1957 |
| 2,829,626 | West | Apr. 8, 1958 |